(12) United States Patent
Liang et al.

(10) Patent No.: US 11,562,768 B1
(45) Date of Patent: Jan. 24, 2023

(54) TAPE HEAD PITCH SPACING

(71) Applicant: International Business Machines Corporation, Armonk, NY (US)

(72) Inventors: Jason Liang, Campbell, CA (US); Robert Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/465,702

(22) Filed: Sep. 2, 2021

(51) Int. Cl.
*G11B 5/008* (2006.01)
*G11B 21/08* (2006.01)

(52) U.S. Cl.
CPC ........ *G11B 21/086* (2013.01); *G11B 5/00813* (2013.01)

(58) Field of Classification Search
None
See application file for complete search history.

(56) References Cited

U.S. PATENT DOCUMENTS

| | | | |
|---|---|---|---|
| 6,424,499 B1* | 7/2002 | Balakrishnan | G11B 5/4893 360/245.9 |
| 6,522,499 B1* | 2/2003 | Takayama | G11B 5/10 360/129 |
| 8,154,811 B2 | 4/2012 | Barsotti et al. | |
| 8,797,672 B2 | 8/2014 | Tanabe et al. | |
| 9,007,712 B1 | 4/2015 | Biskeborn et al. | |
| 9,153,280 B2 | 10/2015 | Bui et al. | |
| 9,324,350 B2 | 4/2016 | Biskeborn et al. | |
| 2004/0120070 A1* | 6/2004 | Ito | G11B 5/584 |
| 2004/0141250 A1* | 7/2004 | Harper | G11B 5/584 |
| 2005/0036227 A1* | 2/2005 | Hoerger | G11B 5/4886 |
| 2005/0152066 A1* | 7/2005 | Yip | G11B 5/4976 |
| 2005/0168865 A1* | 8/2005 | Simmons | G11B 5/4976 |
| 2008/0024905 A1* | 1/2008 | Johnson | G11B 5/584 |
| 2008/0068750 A1* | 3/2008 | Biskeborn | G11B 5/29 |
| 2008/0112077 A1* | 5/2008 | Maejima | G11B 5/00826 |
| 2008/0137235 A1* | 6/2008 | Biskeborn et al. | G11B 5/584 |
| 2009/0231756 A1* | 9/2009 | Koeppe | G11B 5/00826 360/110 |
| 2013/0258519 A1* | 10/2013 | Poorman | G11B 5/00813 360/110 |

FOREIGN PATENT DOCUMENTS

WO 2015016835 A1 2/2015

OTHER PUBLICATIONS

Argumedo et al., "Scaling tape-recording areal densities to 100 GB/in2," IBM Journal of Research and Development, vol. 52, No. 4/5, Jul./Sep. 2008, pp. 513-527.

* cited by examiner

Primary Examiner — Peter Vincent Agustin
(74) Attorney, Agent, or Firm — Zilka-Kotab, P.C.

(57) ABSTRACT

An apparatus includes a magnetic head having a first array of read transducers, an array of write transducers, and a second array of read transducers. A center-to-center pitch of the read transducers in the first array is less than a center-to-center pitch of the write transducers. A center-to-center pitch of the read transducers in the second array is greater than a center-to-center pitch of the write transducers. The read transducers in the first and second arrays are aligned with the write transducers along an intended direction of tape travel thereacross for enabling read-while-write operation.

14 Claims, 13 Drawing Sheets

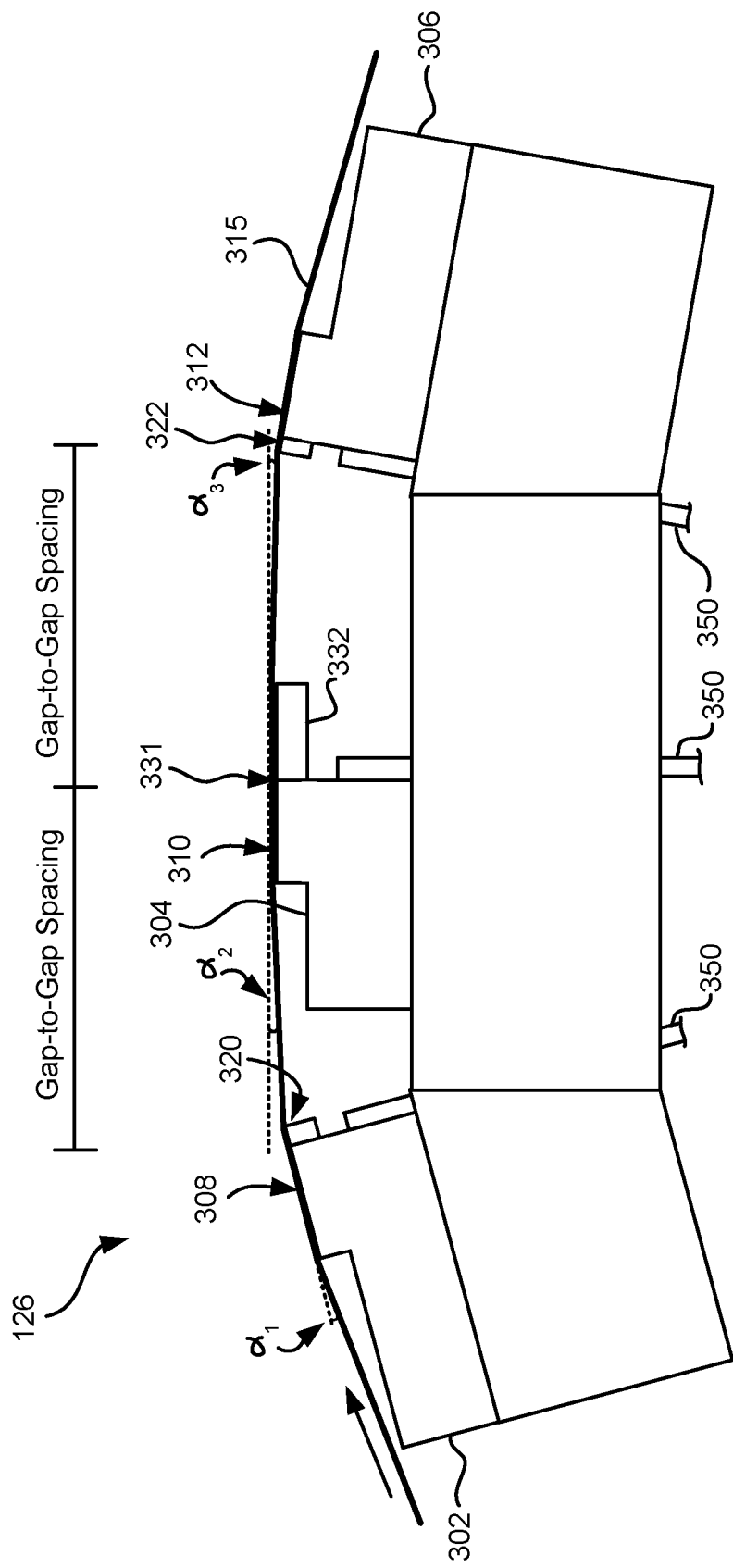

TAPE HEAD PITCH SPACING

BACKGROUND

The present invention relates to data storage systems, and more particularly, this invention relates to pitch spacing of read or write elements in tape head modules.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

In a tape drive system, the drive moves the magnetic tape over the surface of the tape head at high speed. Usually, the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

During non-operation, magnetic recording tapes are sometimes unloaded from tape drives, and stored for long durations of time. Changes in media lateral dimensions may occur during long periods of storage, such as long-term media creep (where the width of the tape creeps from its initial form, also known in the art as "aging"), which tends to occur over time when a tape is wound around a hub of a tape cartridge. Long-term media creep is particularly problematic when dealing with tape dimensional stability issues, as the two ends of the tape exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. Accordingly, the ends of the tape exhibit oppositely-oriented lateral dimensional changes.

When the dimensions of the tape, the head, or both, change, various issues arise. During writing, the likelihood of overwriting shingled tracks increases. Overwritten data is often unrecoverable. Likewise, during readback, if readers are no longer over the tracks to be read, reading errors increase.

SUMMARY

An apparatus, according to one general embodiment, includes a magnetic head having a first array of read transducers, an array of write transducers, and a second array of read transducers. A center-to-center pitch of the read transducers in the first array is less than a center-to-center pitch of the write transducers. A center-to-center pitch of the read transducers in the second array is greater than a center-to-center pitch of the write transducers. The read transducers in the first and second arrays are aligned with the write transducers along an intended direction of tape travel thereacross for enabling read-while-write operation.

A method, according to another general embodiment, includes, in response to receiving a request to perform a readback operation on data tracks of a magnetic recording tape, selecting a first array of read transducers for reading in response to determining a lateral condition of the magnetic recording tape is contracted. The method also includes selecting a second array of read transducers for reading in response to determining a lateral condition of the magnetic recording tape is expanded. A center-to-center pitch of the read transducers in the first array is less than an as-written center-to-center pitch of the data tracks being read. A center-to-center pitch of the read transducers in the second array is greater than the as-written center-to-center pitch of the data tracks being read.

An apparatus, according to another general embodiment, includes a magnetic head having a first array of read transducers, a first array of write transducers, a second array of read transducers and a second array of write transducers. A center-to-center pitch of the read transducers in the first array of read transducers is less than a center-to-center pitch of the read transducers in the second array of read transducers. A center-to-center pitch of the write transducers in the first array of write transducers is less than a center-to-center pitch of the write transducers in the second array of write transducers. The read transducers in the first and second arrays of read transducers are aligned with the write transducers in the first and second arrays of write transducers along an intended direction of tape travel thereacross.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a side view of a magnetic tape head with three modules in an overwrap configuration.

DETAILED DESCRIPTION

Figure 1A:
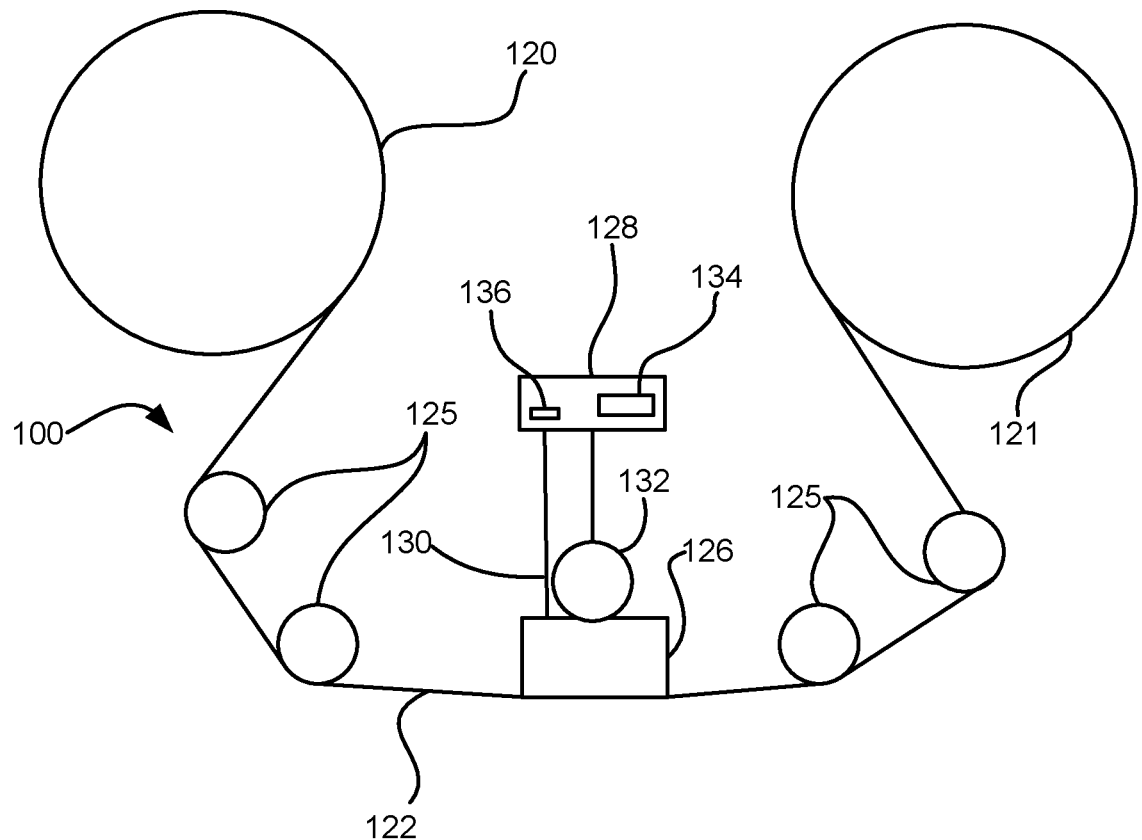
FIG. 1A is a schematic diagram of a simplified tape drive system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic head having a first array of read transducers, an array of write transducers, and a second array of read transducers. A center-to-center pitch of the read transducers in the first array is less than a center-to-center pitch of the write transducers. A center-to-center pitch of the read transducers in the second array is greater than a center-to-center pitch of the write transducers. The read transducers in the first and second arrays are aligned with the write transducers along an intended direction of tape travel thereacross for enabling read-while-write operation.

In another general embodiment, a method includes, in response to receiving a request to perform a readback operation on data tracks of a magnetic recording tape, selecting a first array of read transducers for reading in response to determining a lateral condition of the magnetic recording tape is contracted. The method also includes selecting a second array of read transducers for reading in response to determining a lateral condition of the magnetic recording tape is expanded. A center-to-center pitch of the read transducers in the first array is less than an as-written center-to-center pitch of the data tracks being read. A center-to-center pitch of the read transducers in the second array is greater than the as-written center-to-center pitch of the data tracks being read.

In yet another general embodiment, an apparatus includes a magnetic head having a first array of read transducers, a first array of write transducers, a second array of read transducers and a second array of write transducers. A center-to-center pitch of the read transducers in the first array of read transducers is less than a center-to-center pitch of the read transducers in the second array of read transducers. A center-to-center pitch of the write transducers in the first array of write transducers is less than a center-to-center pitch of the write transducers in the second array of write transducers. The read transducers in the first and second arrays of read transducers are aligned with the write transducers in the first and second arrays of write transducers along an intended direction of tape travel thereacross.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
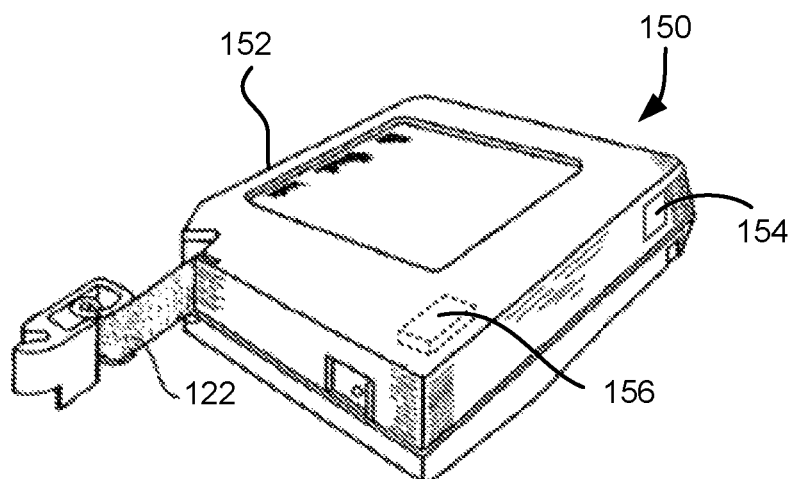
FIG. 1B is a schematic diagram of a tape cartridge, in accordance with one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
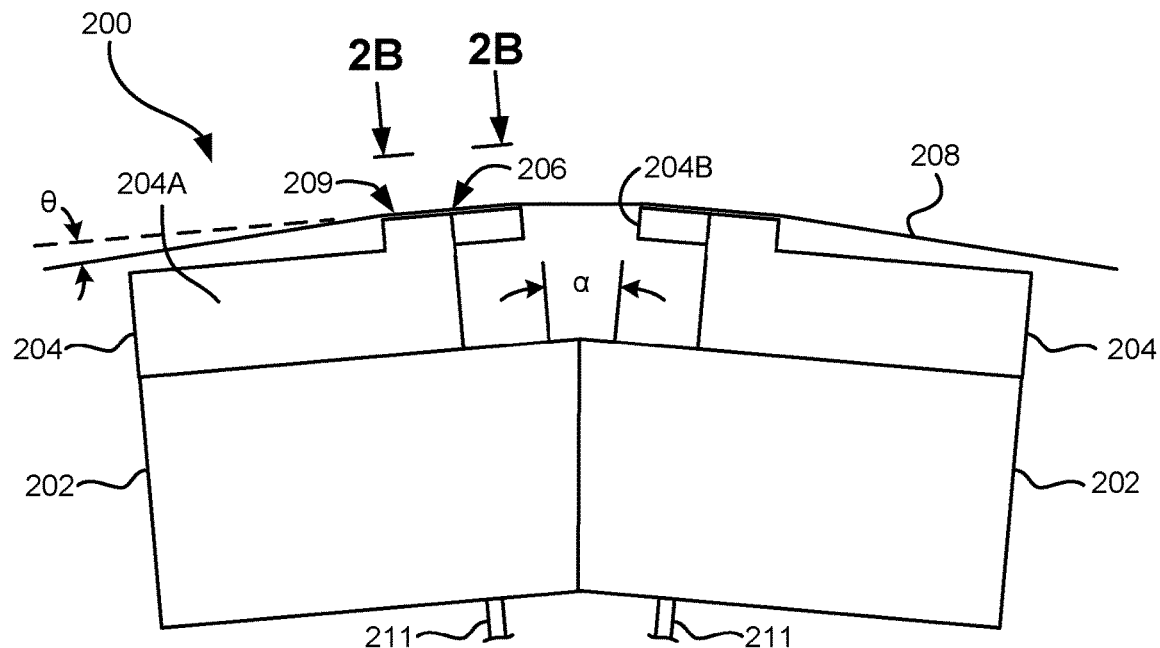
FIG. 2A illustrates a side view of a flat-lapped, bi-directional, two-module magnetic tape head, in accordance with one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 211 are provided for enabling communication between the controller and the transducers 206 of each of the modules 204. Pads on a cable 211 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
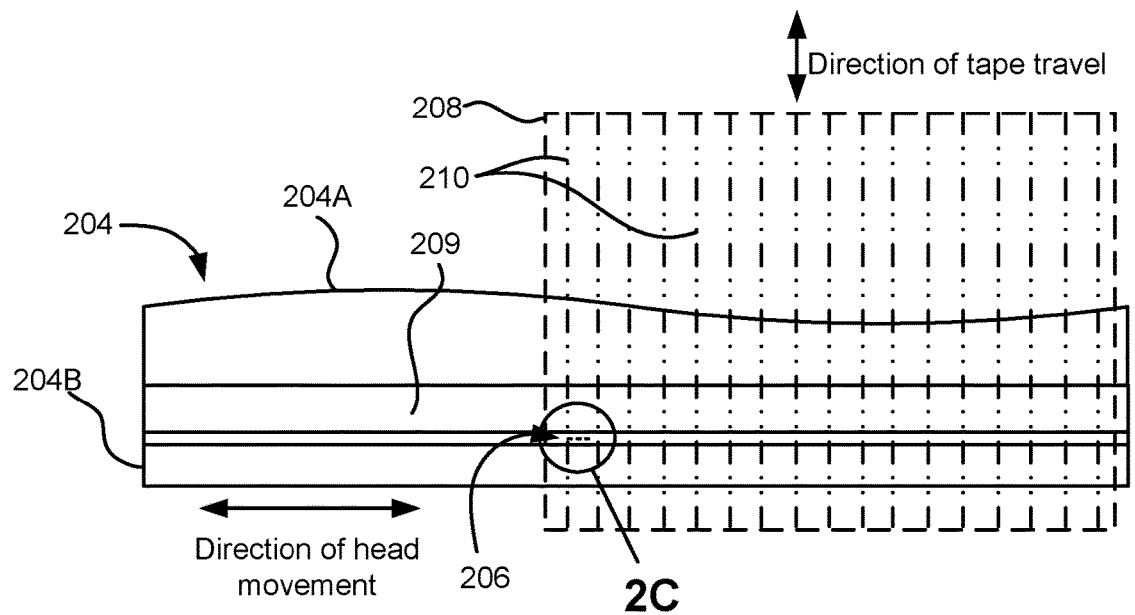
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
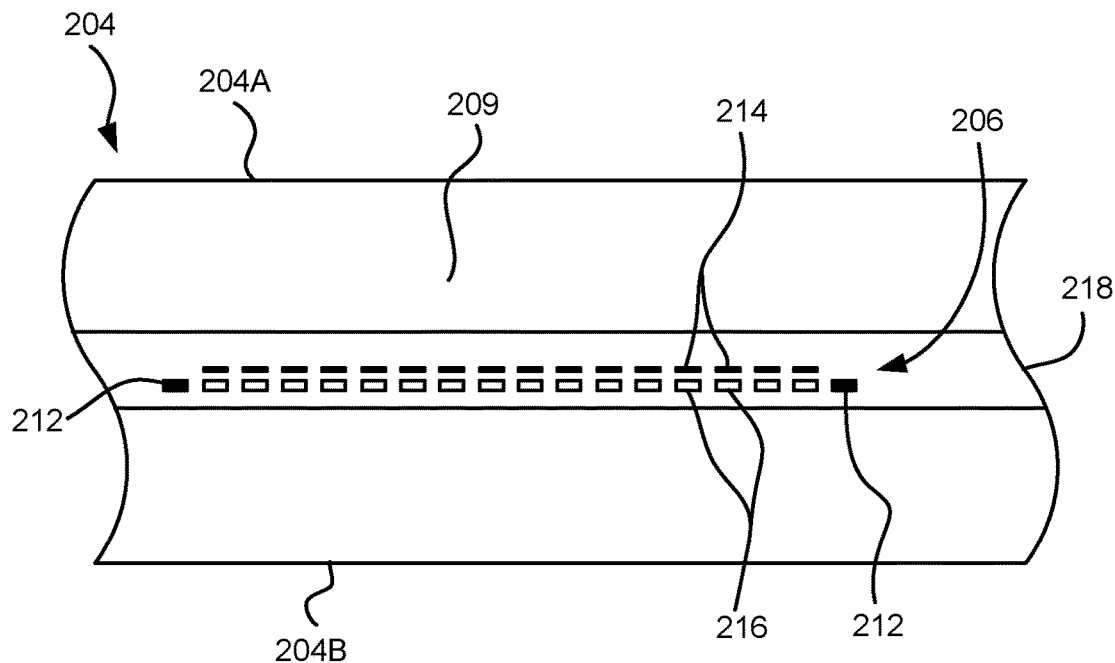
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
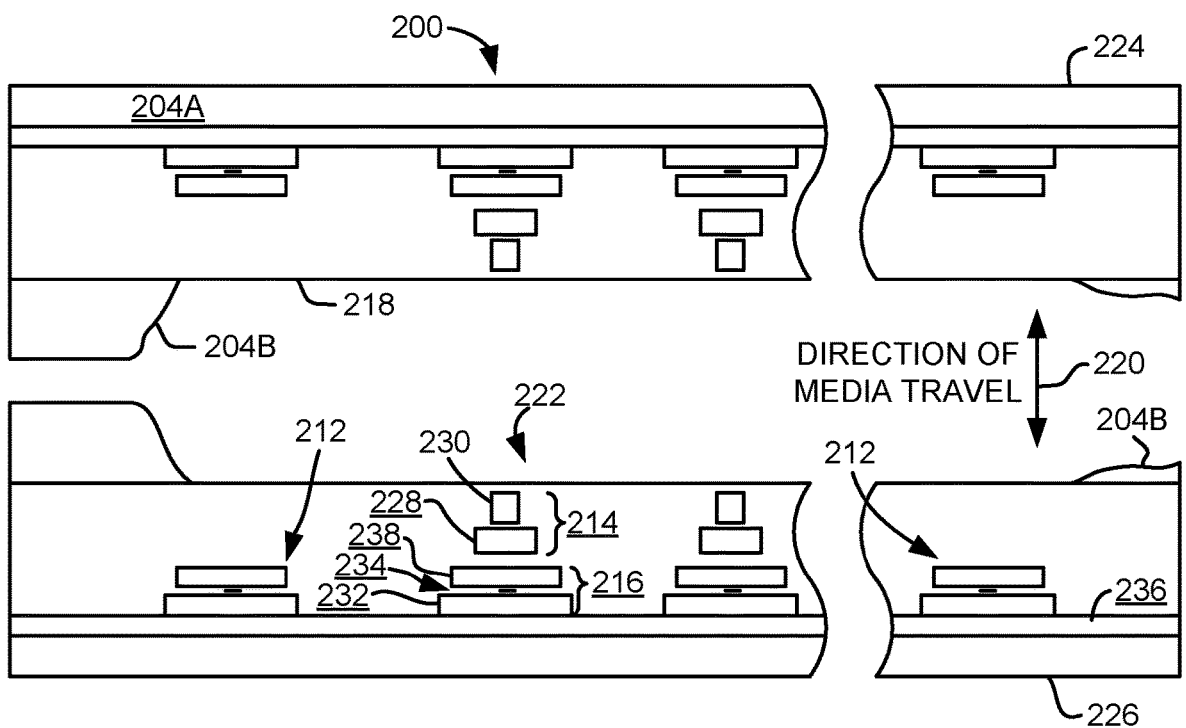
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several RAY pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of RAY pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the RAY pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
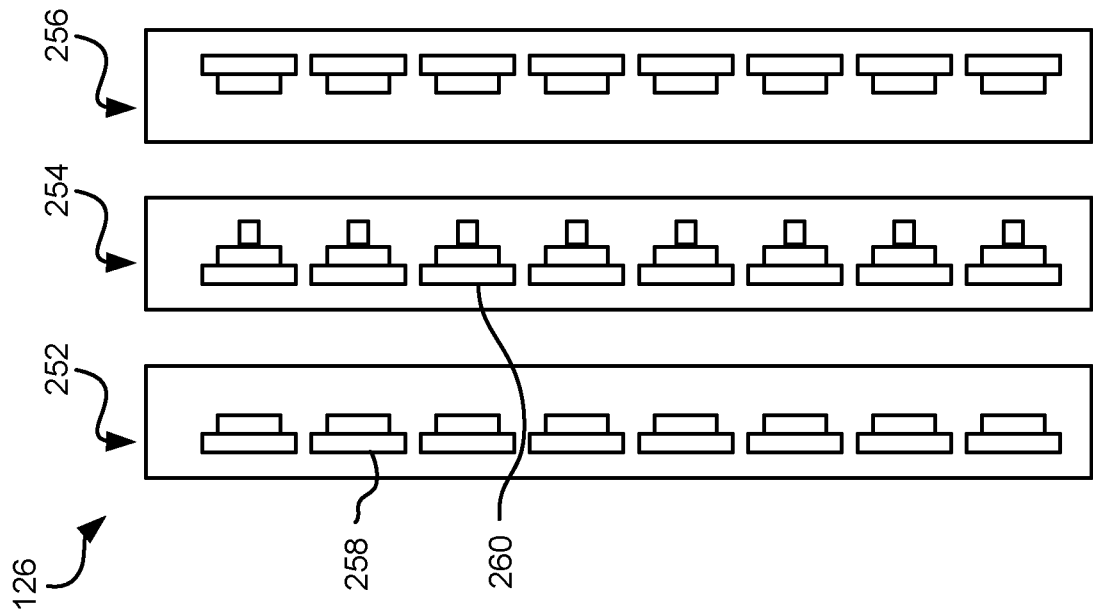
FIG. 4 is a partial tape bearing surface view of a magnetic head having a read-write-read configuration, in accordance with one embodiment.
Figure 3:
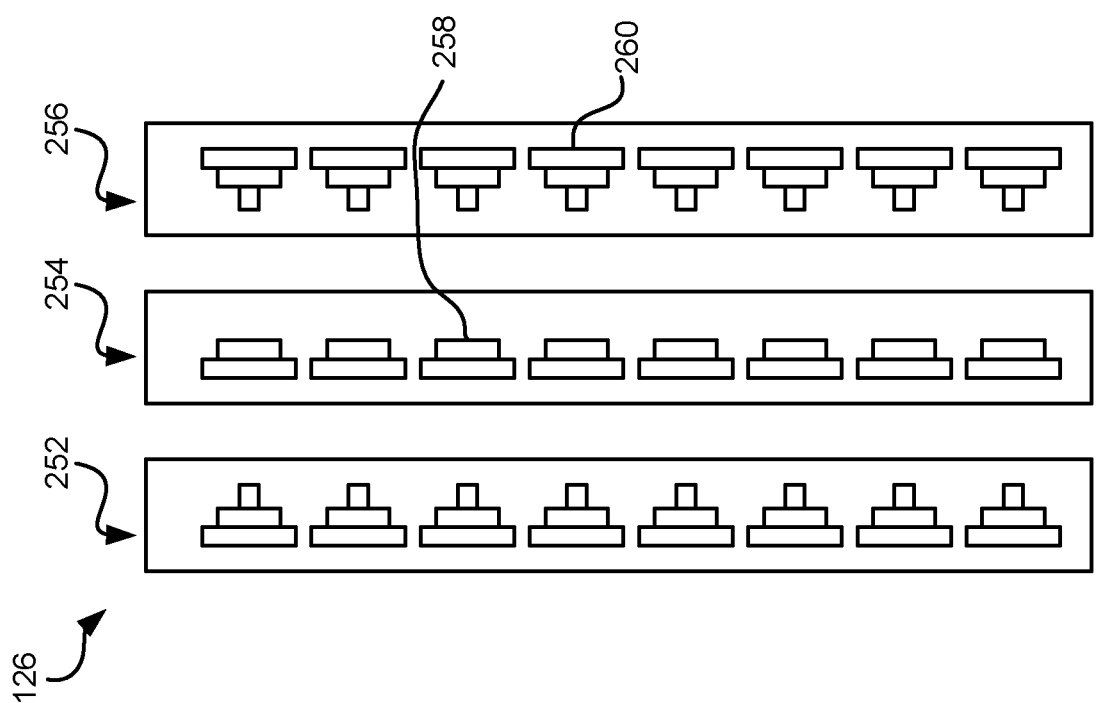
FIG. 3 is a partial tape bearing surface view of a magnetic head having a write-read-write configuration, in accordance with one embodiment.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a W-R-W head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
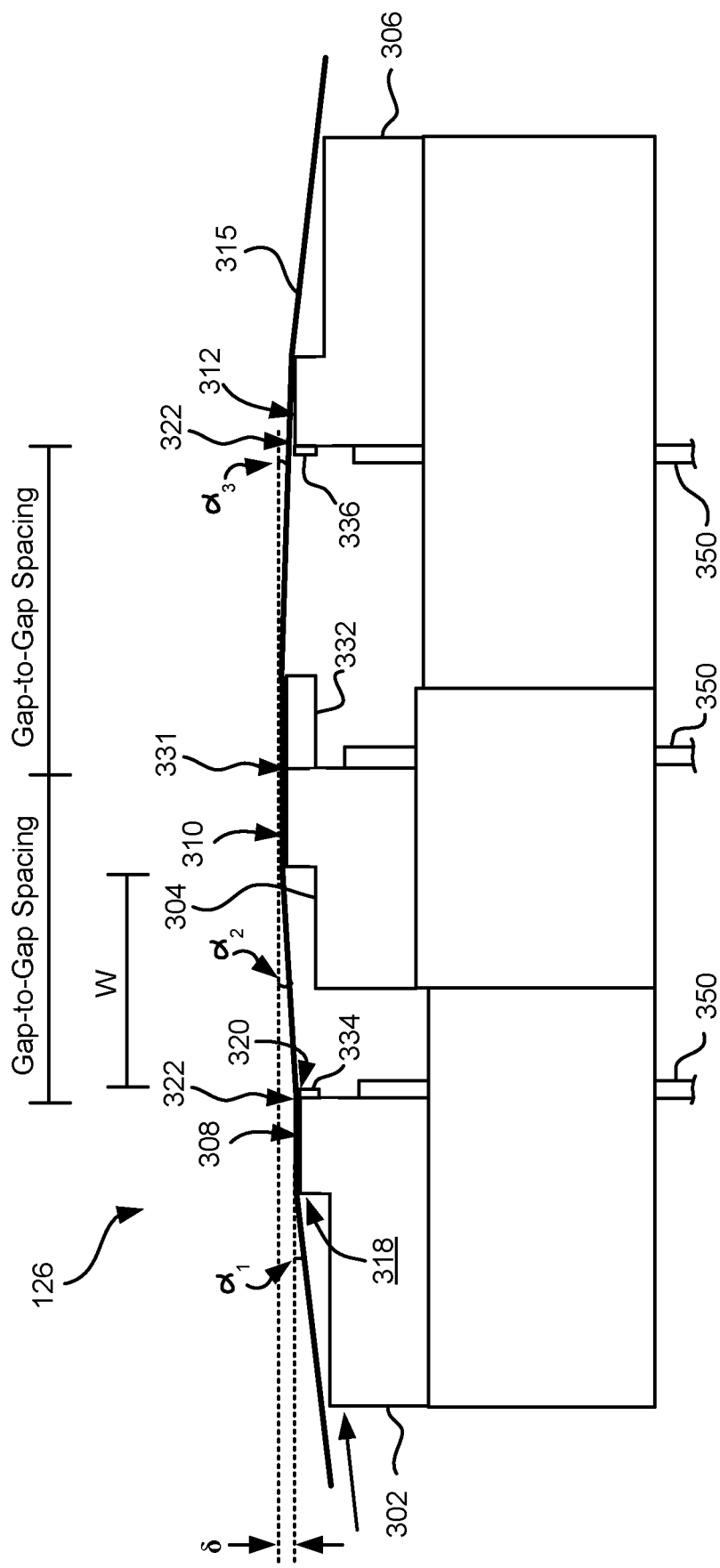
FIG. 5 is a side view of a magnetic tape head with three modules according to one embodiment where the modules all generally lie along about parallel planes, in accordance with one embodiment.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
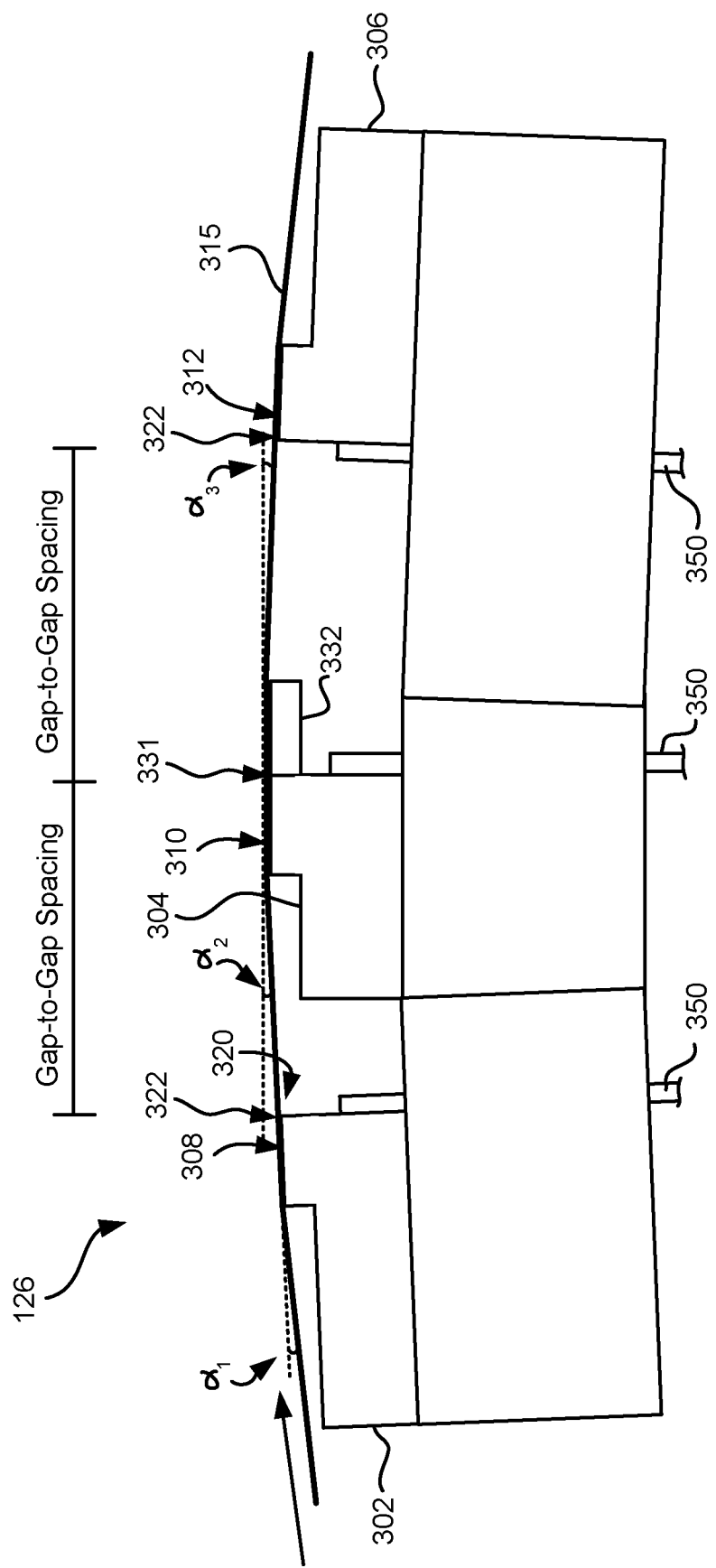
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organkeyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
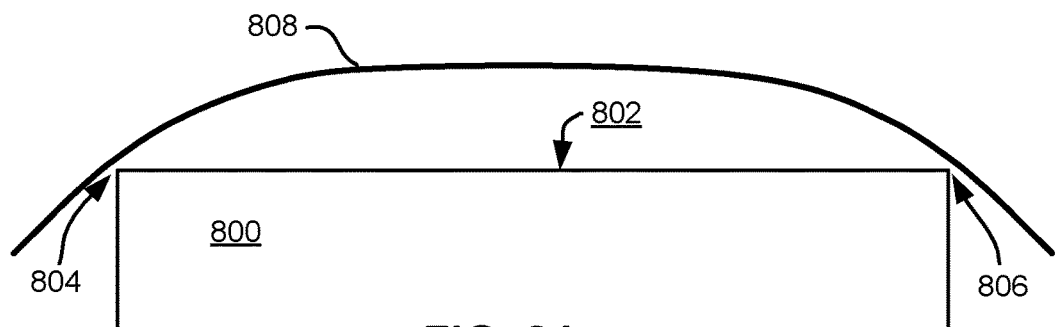
FIGS. 8A-8C are schematics depicting the principles of tape tenting.
Figure 8B:
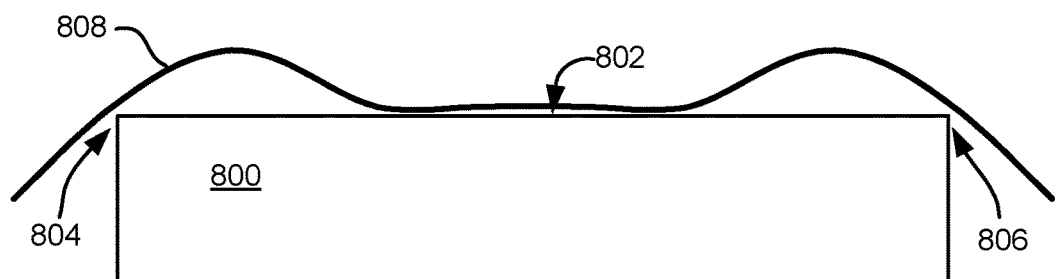
Figure 8C:
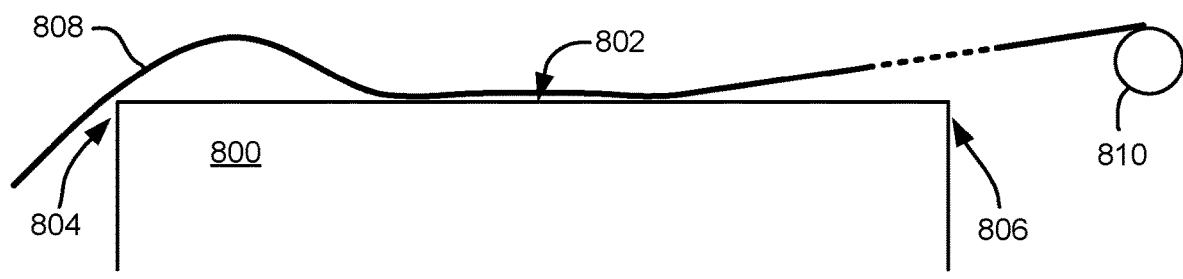

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge, and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
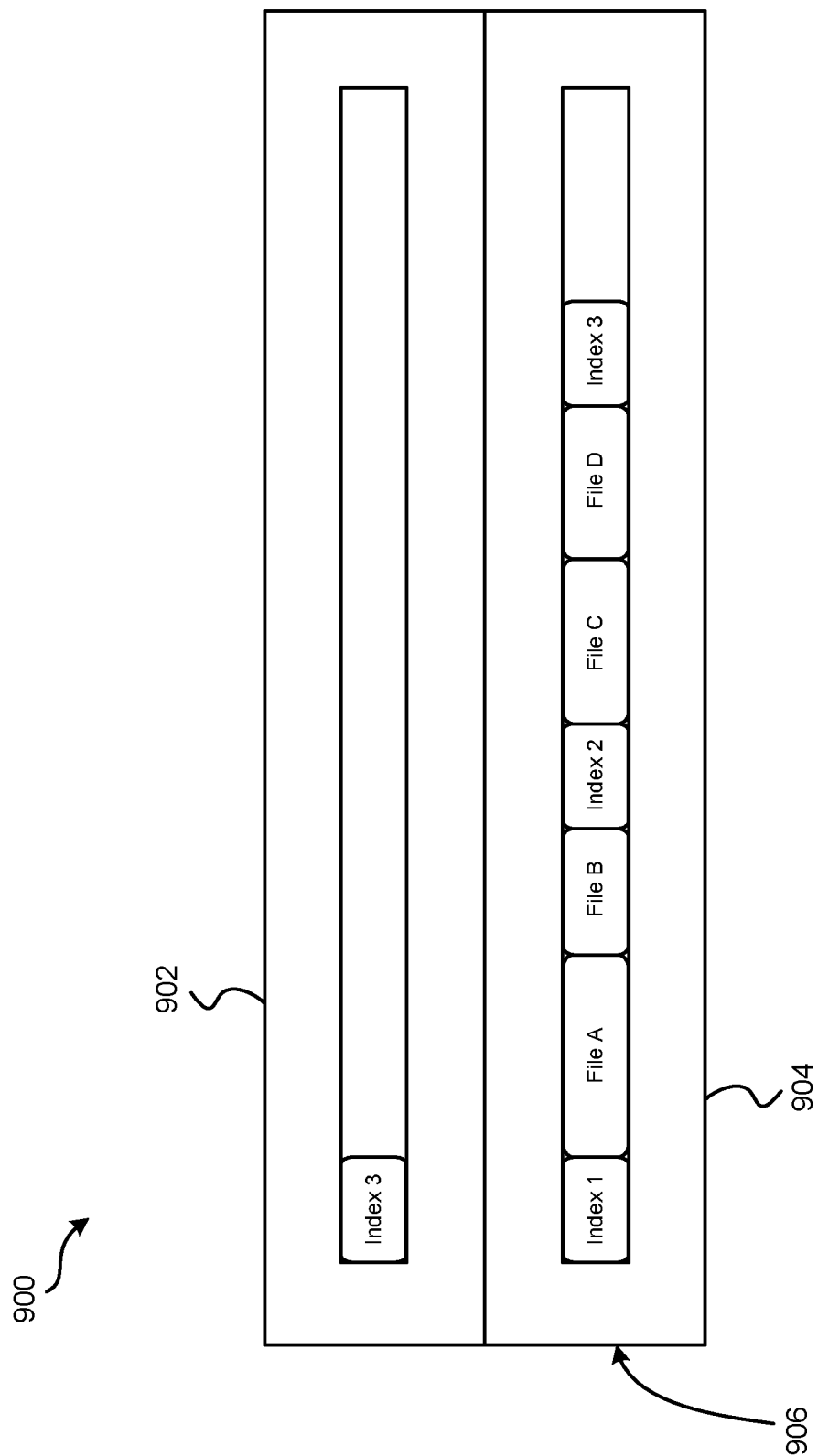
FIG. 9 is a representational diagram of files and indexes stored on a magnetic tape, in accordance with one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again.

The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

During non-use, cartridges having magnetic recording tapes therein are sometimes stored for prolonged periods of time in storage. As a result, the magnetic recording tapes may experience creep, e.g., due to radial compressive stress induced by the tape tension when the tape is wound around a spool prior to storage. Typically, magnetic recording tape creep is not considered a problem for magnetic recording tapes having relatively lower recording densities because any expansion of the tape is typically within permissible tolerances. However, magnetic recording tapes having relatively greater recording densities tend to have much lower reading and writing tolerances, and therefore any change in the tape width due to creep changes the spacing of data tracks on the tape, including the servo tracks and any data tracks previously written. Consequently, the change in tape dimensions is not replicated in the head, and so the transducers will be misaligned with the data tracks, resulting in problems such as overwriting during shingling and/or read errors.

In more detail, changes in media lateral dimensions may occur as a result of magnetic recording tape creep (also known in the art as "aging") during long-term storage of the magnetic recording tape. Such problematic creep tends to occur over time when a tape is wound around a hub of a tape cartridge. Long-term media creep is particularly problematic when dealing with tape dimensional stability issues, as the two ends of the tape wrapped around a hub exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. One reason for this is due to the occurrence of Poisson's ratio on the tape. Accordingly, the ends of the tape exhibit oppositely-oriented lateral dimensional changes.

When the dimensions of the tape, the head, or both change, various issues arise. During writing, the likelihood of overwriting shingled tracks increases. Overwritten data is often unrecoverable. Likewise, during readback, if readers are no longer over the tracks to be read, reading errors increase.

Figure 10:
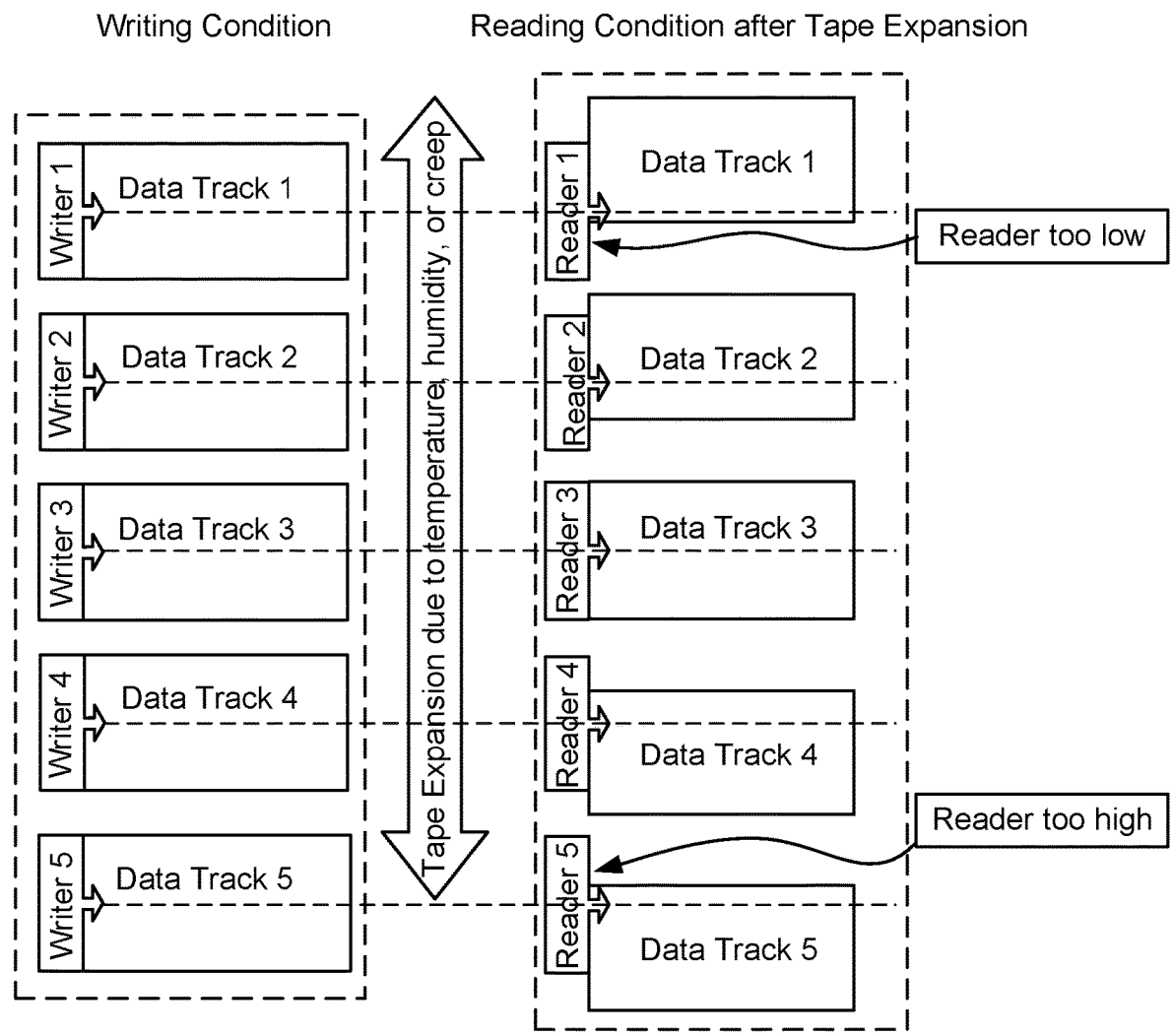
FIG. 10 is a representational diagram of the effect of tape lateral expansion and consequential transducer misregistration.
Figure 11:
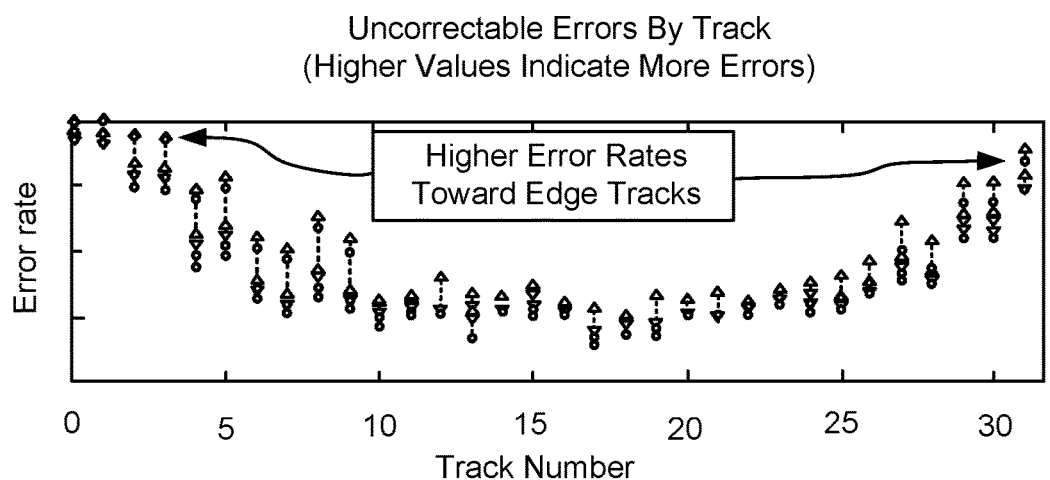
FIG. 11 is a chart exemplifying the increase in error rate toward outer ends of a reader array due to a misregistration of the readers toward the outer ends of the array.

For purposes of an example, FIG. 10 depicts the effect of a change in dimension of a head and/or tape after writing has occurred. For simplicity, five data tracks are shown, labeled Data Track 1 through Data Track 5. As shown, the data tracks are written at a certain spacing, referred to as the writing condition. However, some time after writing, the tape has expanded for some reason such as temperature, humidity, creep, etc. Assume the readers have the same spacing as the writers that wrote the data tracks. The track following system centers the middle reader on the middle track, but the outer readers are then partially off track due to the expanded condition of the tape. Accordingly, not only are the outer readers less influenced by the magnetic transitions of the outer data tracks, but shingled tracks adjacent the intended tracks influence the readers, creating noise. Thus, the misregistration results in a higher amount of read errors for tracks positioned toward the ends of the array. FIG. 11 is a chart exemplifying the increase in error rate toward outer ends of a reader array due to a misregistration of the readers toward the outer ends of the array. There is no position that the head move to that will improve readback.

Tape dimensional stability (TDS) has become a significant limitation to the tape technology roadmap. As mentioned above, as tape is stored, the inner wraps of a tape cartridge become expanded due to compression and the outer wraps become contracted due to tension. As a result, the read and write elements on the tape head become displaced from the data tracks. Near the beginning of the tape, the media may be too contracted to read or write to. Near the end of the tape, the media may be too expanded to read or write to. This displacement disrupts one's ability to retrieve written data and introduces overwriting on previously written data.

Conventional tension control methods which stretch or relax the tape to cause the tape to contract or expand in the width-wise direction have several drawbacks. For example, tension control results in much worse Position Error Signal (PES) if the tape is too overrelaxed and can snap the tape if the tape is overstretched. There are additional issues with tension control such as inner pack wrinkling, and other issues known in the art.

Other conventional solutions to address TDS include tilting the head, stretching the head with heat activation, and other devices that stretch and/or squeeze the head. All of the foregoing proposed solutions have drawbacks including moving parts of unknown reliability, loss of backward compatibility, difficulty in performing read-while-write, and significant demands on the buffer and channel.

In stark contrast, various aspects of the present disclosure include a tape head having multiple reader modules and/or multiple writer modules where one set of the modules is built to have a relatively more contracted transducer pitch spacing and another set of the modules is built to have a relatively more dilated transducer pitch spacing. In at least some approaches, if the tape is shrunken in width, the drive employs the contracted read and/or write transducers. Conversely, if the tape is expanded, the drive switches to the expanded read and/or write transducers. Whether the tape is contracted or expanded may be determined in any manner known in the art, e.g., by comparing the distance between servo tracks at a present time compared to what the same distance was upon writing the tape. Tension control may be used for fine tuning, in some aspects. Advantageously, the tape head according to at least some of the aspects described herein does not use moving parts which increase unreliability, enables backwards compatibility, and maintains read-while-write. More importantly, such a tape head allows read back of media which has experienced excessive tape dimensional stability (TDS) issues due to storage, environment, and/or creep. Where a conventional tape head may have difficulty reading data from a tape section which is significantly contracted or significantly expanded, various aspects of the present disclosure are able to accommodate such conditions.

A tape head having arrays having relatively larger and relatively smaller transducer pitch according to various aspects described herein would be beneficial in a customer service environment including hyperscalers. In an exemplary aspect, a first reader array may be built on a contracted pitch and a second reader array may be built on a relatively expanded pitch. All three modules may be in contact with the tape. If the servos detect that the portion of tape being operated on is contracted, the drive may use the first reader module to read. In some instances, a relatively small amount of data is stored in a buffer so that near the middle of the tape cartridge, when the media becomes expanded, the drive switches the reading to the second reader module with relatively more dilated elements. The data stream from the first reader is then concatenated with the data stream from the second to form a continuous data stream.

Figure 12:
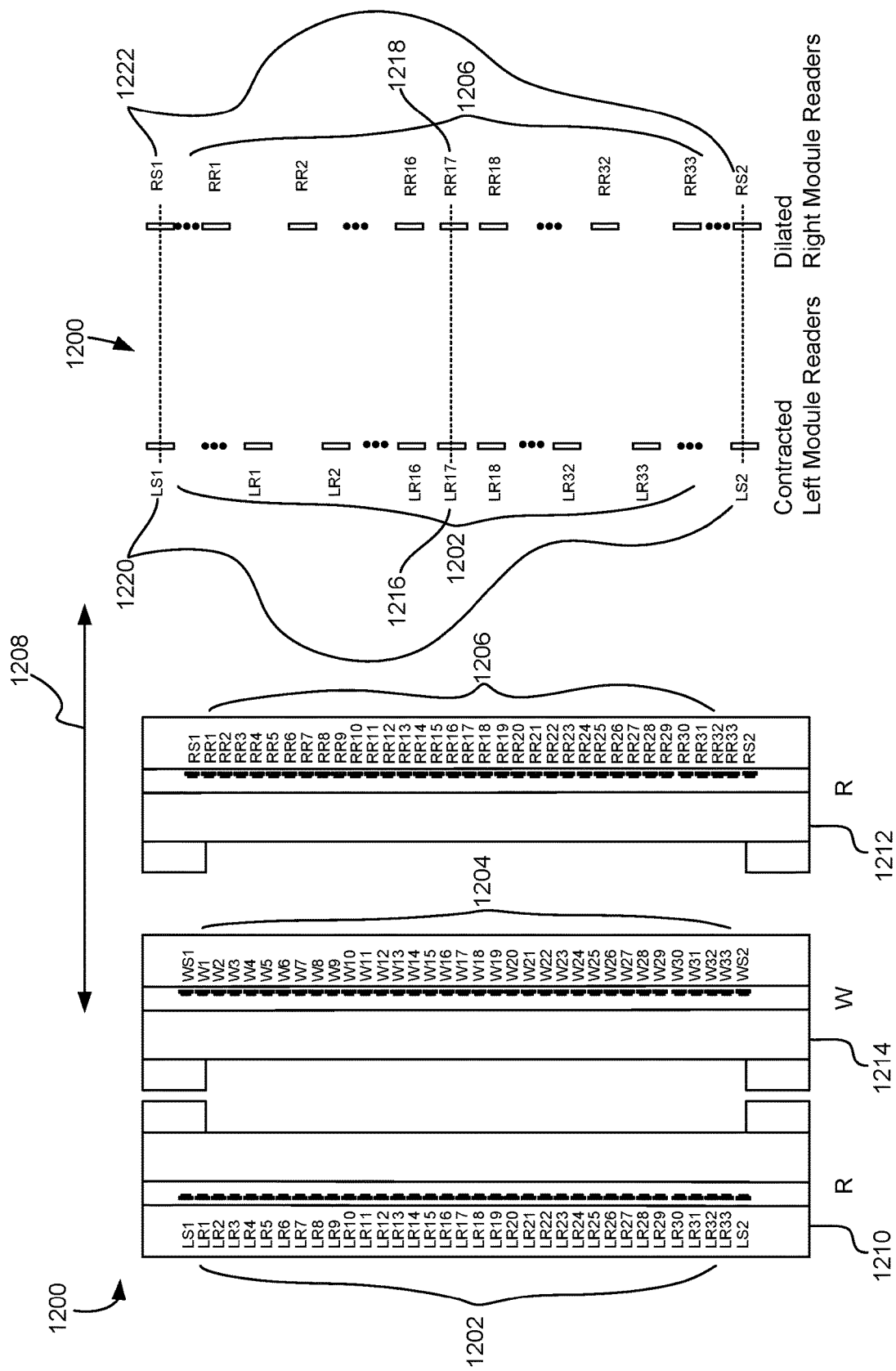
FIGS. 12A-12B are representational diagrams of a R-W-R head having transducers on different pitches, in accordance with one aspect of the present invention.

FIGS. 12A-12B depict an apparatus 1200, in accordance with one embodiment. As an option, the present apparatus 1200 may be implemented in conjunction with features from any other embodiment listed herein, such as those described with reference to the other FIGS. Of course, however, such apparatus 1200 and others presented herein may be used in various applications and/or in permutations which may or may not be specifically described in the illustrative embodiments listed herein. Further, the apparatus 1200 presented herein may be used in any desired environment.

As shown, the apparatus 1200 comprises a magnetic head having a first array of read transducers 1202 (R), an array of write transducers 1204 (W), and a second array of read transducers 1206 (R). In preferred aspects, a center-to-center pitch of the read transducers 1202 in the first array is less than a center-to-center pitch of the write transducers 1204. Further, a center-to-center pitch of the read transducers 1206 in the second array is preferably greater than a center-to-center pitch of the write transducers 1204. The center to center-to-center pitch of the write transducers 1204 is preferably the design pitch specified in the particular recording format for which the write transducer array 1204 is designed.

The read transducers in the first and second arrays (e.g., 1202 and 1206, respectively) are generally aligned with the write transducers 1204 along an intended direction of tape travel 1208 thereacross for enabling read-while-write operation. For example, the readers in both arrays are aligned with the envelope of the written track, in various approaches, even though the pitch of the readers in the arrays are different. This is acceptable in most instances for read-while-write operation, because the as-written track is wider than the final, shingled track that remains on the tape. Later, during readback, the reader array having a transducer pitch most closely approximating the track pitch may be used to read the tracks on the tape.

In various approaches, the first array of read transducers 1202 is present on a first module 1210 and the second array of read transducers 1206 is present on a second module 1212, as shown in FIG. 12A. The array of write transducers 1204 may be located on a third module 1214 positioned between the first and second modules (e.g., 1210 and 1212, respectively), as shown in FIG. 12A. In another approach, the array of write transducers 1204 is located on the first module 1210 (e.g., with the first array of read transducers 1202) or on the second module 1212. In yet another approach, the first array of read transducers 1202 is present on a same module as the second array of read transducers 1206, with a second module having both arrays 1202, 1206, potentially providing an advantage for bidirectional reading. In yet another approach, all three arrays 1202, 1204, 1206 are on the same module. In even yet further approaches, an array of write transducers 1204 is present on each of the outer modules 1210, 1212 rather than on a center module. Accordingly, the locations of the various arrays 1202, 1204, 1206 and/or numbers of the various arrays can be in any desired arrangement.

FIG. 12B depicts the relatively different pitches of the read transducers of the two arrays of read transducers 1202, 1206. As shown in FIG. 12B, a centermost read transducer LR17, 1216 of the first array of read transducers 1202 is aligned with the centermost read transducer RR17, 1218 of the second array of read transducers 1206 in the intended direction of tape travel 1208, and preferably with the centermost write transducer W17. In other approaches, the centermost pair of read transducers of the first array of read transducers 1202 is aligned with the centermost pair of read transducers of the second array of read transducers 1206 in the intended direction of tape travel 1208. In yet other approaches, any read transducer and/or combination of read transducers of the first array of read transducers 1202 may be aligned with any read transducer and/or combination of read transducers of the second array of read transducers 1206 in the intended direction of tape travel 1208.

As further shown in FIG. 12B, the apparatus 1200 includes first servo read transducers 1220 flanking the first array of read transducers 1202 and second servo read transducers 1222 flanking the second array of read transducers 1206. The first servo read transducers 1220 are preferably aligned with the second servo read transducers 1222 in the intended direction of tape travel 1208.

In various approaches, the apparatus 1200 includes a drive mechanism (not shown) for passing a magnetic medium over the arrays and a controller (not shown) electronically coupled to the read transducers and the write transducers, in a manner which would become apparent to one having ordinary skill in the art upon reading the present disclosure.

Figure 13:
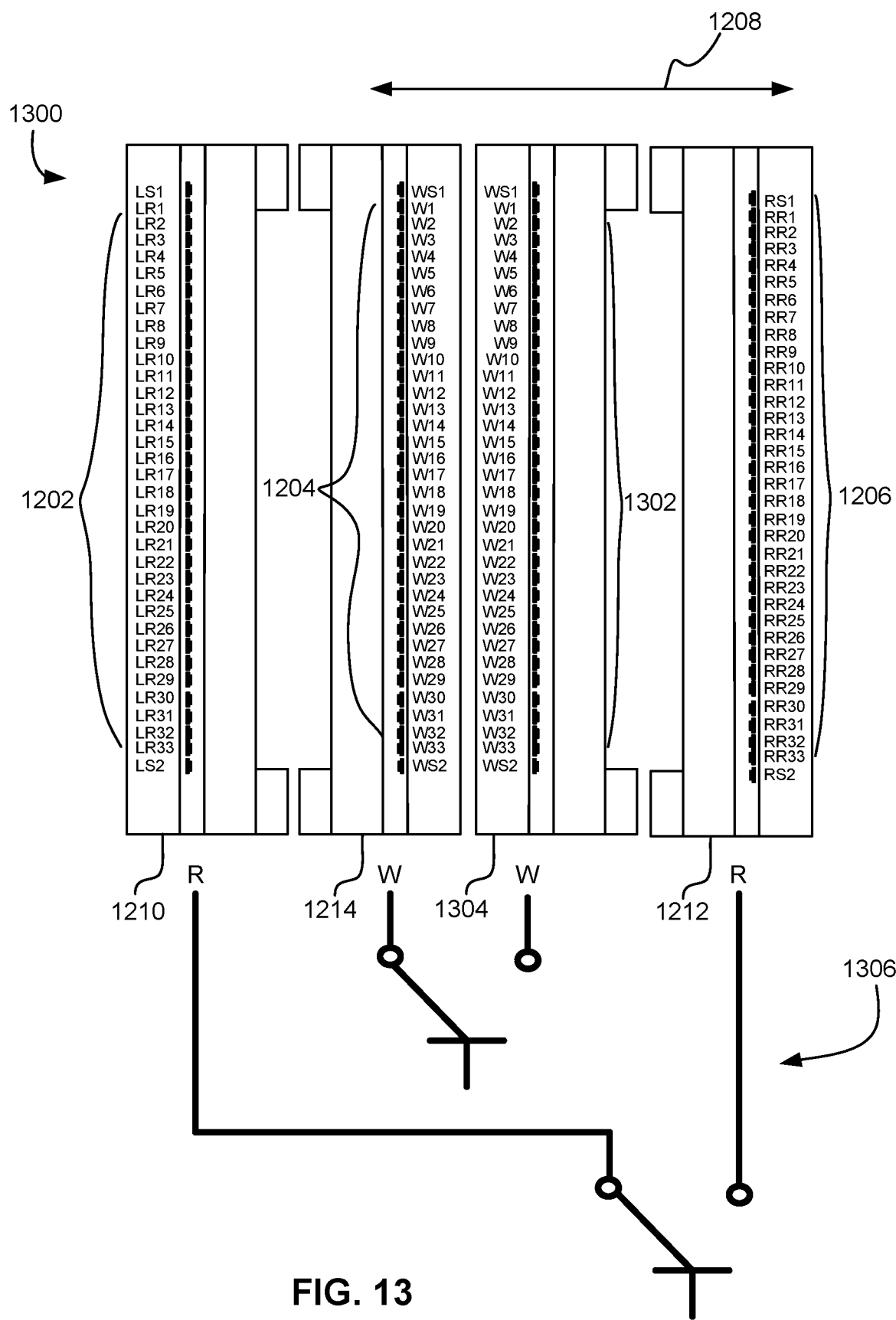
FIG. 13 is a representational diagram of a R-W-W-R head having transducers on different pitches, in accordance with one aspect of the present invention.

FIG. 13 depicts an apparatus 1300, in accordance with one embodiment. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment.

Apparatus 1300 depicts an exemplary alternative embodiment of apparatus 1200 of FIGS. 12A-12B. Accordingly, similar features have similar numbering and function, unless otherwise described herein. As shown in FIG. 13, an apparatus 1300 comprises a second array of write transducers 1302 (W) located on a fourth module 1304 positioned between the first module 1210 and second module 1212 (e.g., the first array of read transducers 1202 being located on the first module 1210 and the second array of read transducers 1206 being located on the second module 1212).

In at least one approach, one array of write transducers has a different pitch than the other array of write transducers. For example, the first array of write transducers 1204 has a greater center-to-center pitch than the center-to-center pitch of the second array of write transducers 1302, or vice versa. In other approaches, the pitch of the write transducers in each array of write transducers is about the same. For example, the first array of write transducers 1204 has about the same center-to-center pitch as the center-to-center transducer pitch of the second array of write transducers 1302, and vice versa.

In at least one approach, the first array of read transducers is present on a same module as the second array of read transducers. A second module may comprise a third array of read transducers and a fourth array of read transducers having similar transducer pitches as the first and second arrays. Preferably, the center-to-center pitch of the read transducers in the third array is lower than a center-to-center pitch of the write transducers, while the center-to-center pitch of the read transducers in the fourth array is higher than a center-to-center pitch of the write transducers. The write transducers in the third and fourth arrays are preferably aligned with the write transducers along the intended direction of tape travel (e.g., the intended direction of tape travel 1208) thereacross for enabling read-while-write operation.

In one approach, a center-to-center pitch of the read transducers in the first array of read transducers 1202 is less than a center-to-center pitch of the read transducers in the second array of read transducers 1206, or vice versa. In this approach, a center-to-center pitch of the write transducers in the first array of write transducers 1204 is less than a center-to-center pitch of the write transducers in the second array of write transducers 1302, or vice versa, or the pitches of the write transducers in both arrays 1204, 1302 may be the same. The read transducers in the first and second arrays of read transducers (e.g., 1202 and 1206, respectively) are preferably aligned with the write transducers in the first and second arrays of write transducers (e.g., 1204 and 1302, respectively) along an intended direction of tape travel 1208 thereacross.

In various approaches, the apparatus 1300 includes a drive mechanism (not shown) for passing a magnetic medium over the arrays and a controller (not shown) electronically coupled to the read transducers and the write transducers, in a manner which would become apparent to one having ordinary skill in the art upon reading the present disclosure. The controller is preferably configured to select either the first arrays (e.g., 1202 and 1206) or the second arrays (e.g., 1204 and 1302) to perform read while write operations based on a lateral condition of the magnetic recording tape, to be discussed in further detail below.

A switching mechanism 1306 of a type known in the art may be used to select the arrays to be used for a data operation. Such switching mechanism 1306 may be positioned on the head, the controller, or both.

Figure 14:
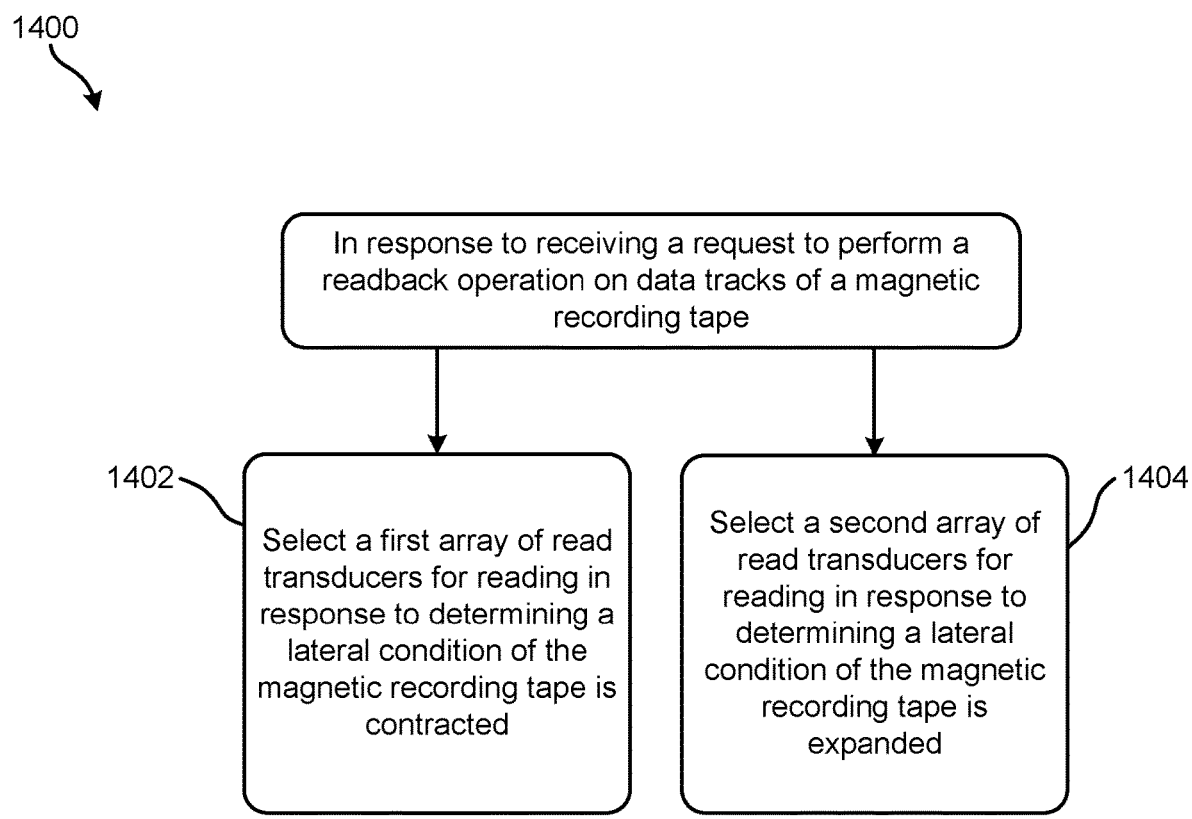
FIG. 14 is a flowchart of a method, in accordance with one aspect of the present invention.

Now referring to FIG. 14, a flowchart of a method 1400 is shown according to one embodiment. The method 1400 may be performed in accordance with the present invention in any of the environments depicted in other FIGS., in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, method 1400 includes operation 1402. Operation 1402 includes, in response to receiving a request to perform a readback operation on data tracks of a magnetic recording tape, selecting a first array of read transducers for performing a reading operation in response to determining a lateral condition of the magnetic recording tape is contracted. A contracted lateral condition of the magnetic recording tape may refer to tracks which are closer together than the tracks were when the tracks were first written (e.g., "as written"), as would be understood by one having ordinary skill in the art. The request to perform a readback operation on data tracks of a magnetic recording tape may be received in any manner known in the art.

Method 1400 includes operation 1404. Operation 1404 includes, in response to receiving a request to perform a readback operation on data tracks of a magnetic recording tape, selecting a second array of read transducers for reading in response to determining a lateral condition of the magnetic recording tape is expanded. An expanded lateral condition of the magnetic recording tape may refer to tracks which are farther apart than the tracks were when the tracks were first written (e.g., "as written"), as would be understood by one having ordinary skill in the art. The request to perform a readback operation on data tracks of a magnetic recording tape may be received in any manner known in the art.

In at least some aspects of method 1400, a center-to-center pitch of the read transducers in the first array is less than an as-written (e.g., at the time of writing) center-to-center pitch of the data tracks being read at some point during use. Further, a center-to-center pitch of the read transducers in the second array is greater than the as-written (e.g., at the time of writing) center-to-center pitch of the data tracks being read at some point during use.

Method 1400 may include detecting the lateral condition of the magnetic recording tape. In various aspects, the lateral condition of the magnetic recording tape refers to a state of expansion or contraction, as would become apparent to one having ordinary skill in the art upon reading the present disclosure. The lateral condition of the magnetic recording tape may be determined in any manner known in the art.

In preferred aspects, the lateral condition is detected using servo read transducers. Method 1400 may include, during performance of the read back operation, transitioning from one array to the other array based on the lateral condition determined using the servo read transducers. For example, in response to the servo read transducers detecting a change in lateral condition of the magnetic recording tape, method 1400 includes transitioning from the first array of read transducers to the second array of read transducers, or vice versa, based at least in part on the detected change in lateral condition of the magnetic recording tape. Detecting a change in lateral condition may refer to detecting a shift from an "expected" lateral condition (e.g., the current center-to-center pitch of the data tracks are about equal to the as-written center-to-center pitch of the data tracks) to either an expanded state or a contracted state, or vice versa. A change in lateral condition may also refer to a shift from an expanded state to a contracted state, or vice versa.

In one exemplary implementation, the lateral condition is determined at various intervals, e.g., periodically, after a predefined length of tape has been read, etc., during performance of the readback operation. The transition from one array to the other array may be performed accordingly.

In another exemplary aspect, the lateral condition is determined based on a position along the tape where the reading begins. For example, if the start of reading is to occur toward the beginning of the magnetic recording tape, the lateral condition may be determined to be contracted (e.g., as is typical for that end). Similarly, if the start of reading is to occur more toward the end of the magnetic recording tape (e.g., closest to the cartridge spool), the lateral condition may be determined to be expanded (e.g., as is typical for that end).

In at least some aspects, selecting the first array of read transducers and/or the second array of read transducers (e.g., in response to determining the lateral condition) may occur immediately upon receiving the request. In other aspects, selecting the first array of read transducers and/or the second array of read transducers may occur after a predetermined period of time (e.g., during the reading) after receiving the request, any time after receiving the request, etc., any such selection being deemed as performed in response to receiving the request.

Method 1400 may optionally include buffering data received from the first array during performance of the readback operation and concatenating the data received from the first array with data received from the second array in response to transitioning from the first array to the second array. In some aspects, the buffering may be performed in a sliding window fashion. The buffering and concatenating may be performed to maintain a generally continuous data stream. Similar procedures may occur when transitioning from the second array to the first array, in a manner which would become apparent to one having ordinary skill in the art upon reading the present disclosure.

In various aspects, method 1400 may include using tension control to adjust the lateral condition of the magnetic recording tape during performance of the readback operation. Tension control may be used to fine tune the magnetic recording tape (e.g., tuning the lateral condition of the magnetic recording tape into a less expanded and/or contracted state) for enhancing performance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a magnetic head having a first array of read transducers located on a first module, a second array of read transducers located on a second module, an array of write transducers located on a third module positioned between the first and second modules, and a second array of write transducers located on a fourth module positioned between the first and second modules,
    wherein a center-to-center pitch of the read transducers in the first array is less than a center-to-center pitch of the write transducers,
    wherein a center-to-center pitch of the read transducers in the second array is greater than a center-to-center pitch of the write transducers, and
    wherein the read transducers in the first and second arrays are aligned with the write transducers along an intended direction of tape travel thereacross for enabling read-while-write operation.

2. An apparatus as recited in claim 1, wherein a centermost read transducer of the first array is aligned with the centermost read transducer of the second array in the intended direction of tape travel.

3. An apparatus as recited in claim 1, comprising first servo read transducers flanking the first array and second servo read transducers flanking the second array, wherein the first servo read transducers are aligned with the second servo read transducers in the intended direction of tape travel.

4. An apparatus as recited in claim 1, further comprising:
    a drive mechanism for passing a magnetic medium over the arrays; and
    a controller electrically coupled to the read transducers and the write transducers.

5. A method, comprising:
    in response to receiving a request to perform a readback operation on data tracks of a magnetic recording tape, selecting a first array of read transducers for reading in response to determining a lateral condition of the magnetic recording tape is contracted;
    selecting a second array of read transducers for reading in response to determining a lateral condition of the magnetic recording tape is expanded,
    wherein a center-to-center pitch of the read transducers in the first array is less than an as-written center-to-center pitch of the data tracks being read,
    wherein a center-to-center pitch of the read transducers in the second array is greater than the as-written center-to-center pitch of the data tracks being read; and
    buffering data received from the first array during performance of the readback operation, and concatenating the data received from the first array with data received from the second array in response to transitioning from the first array to the second array.

6. A method as recited in claim 5, comprising detecting the lateral condition of the magnetic recording tape.

7. A method as recited in claim 6, wherein the lateral condition is detected using servo read transducers.

8. A method as recited in claim 7, comprising, during performance of the readback operation, transitioning from one array to the other array based on the lateral condition detected using the servo read transducers.

9. A method as recited in claim 5, wherein the lateral condition is determined at least periodically during performance of the readback operation.

10. A method as recited in claim 5, comprising determining the lateral condition of the tape based on a position along the tape where the reading begins.

11. A method as recited in claim 5, comprising using tension control to adjust the lateral condition of the magnetic recording tape during performance of the readback operation.

12. An apparatus, comprising:
a magnetic head having a first array of read transducers, a first array of write transducers, a second array of read transducers and a second array of write transducers,
wherein a center-to-center pitch of the read transducers in the first array of read transducers is less than a center-to-center pitch of the read transducers in the second array of read transducers,
wherein a center-to-center pitch of the write transducers in the first array of write transducers is less than a center-to-center pitch of the write transducers in the second array of write transducers, and
wherein the read transducers in the first and second arrays of read transducers are aligned with the write transducers in the first and second arrays of write transducers along an intended direction of tape travel thereacross.

13. An apparatus as recited in claim 12, further comprising:
a drive mechanism for passing a magnetic medium over the arrays; and
a controller electrically coupled to the read transducers and write transducers.

14. An apparatus as recited in claim 13, wherein the controller is configured to select between the first arrays and the second arrays to perform read while write operations based on a lateral condition of the magnetic recording tape.

* * * * *